US005419464A

United States Patent [19]
Ganrot et al.

[11] Patent Number: 5,419,464
[45] Date of Patent: May 30, 1995

[54] APPARATUS AND PROCESS FOR DISPENSING FOOD MATERIALS

[75] Inventors: Anders B. Ganrot, Bjuv; Slobodan Milohanic, Aengelholm, both of Sweden

[73] Assignee: Nestec S.A., Veney, Switzerland

[21] Appl. No.: 270,591

[22] Filed: Jul. 5, 1994

[30] Foreign Application Priority Data

Jul. 15, 1993 [EP] European Pat. Off. ............ 93111343

[51] Int. Cl.6 ............................................. G01F 11/04
[52] U.S. Cl. ..................................................... 222/380
[58] Field of Search ............................. 222/1, 309, 380

[56] References Cited

U.S. PATENT DOCUMENTS

| | | | |
|---|---|---|---|
| 1,794,388 | 3/1931 | Mojonnier et al. | 222/380 |
| 2,850,990 | 9/1958 | Rasmusson | 222/380 X |
| 3,052,376 | 9/1962 | Fogg | 222/309 X |
| 3,127,071 | 3/1964 | Bingham | 222/380 |
| 3,385,479 | 5/1968 | Austin, Jr. et al. | 222/309 |
| 3,497,111 | 2/1970 | Savage | 222/309 X |
| 4,234,107 | 11/1980 | Gernlein | 222/380 X |
| 4,254,806 | 3/1981 | Elsworth | 222/380 X |
| 4,566,612 | 1/1986 | von Kreuter | 222/309 |
| 5,069,366 | 12/1991 | Graffin | 222/380 X |
| 5,080,148 | 1/1992 | Florida | 222/309 X |
| 5,108,014 | 4/1992 | Nordmeyer et al. | 222/380 |
| 5,127,547 | 7/1992 | Gerich | 222/380 X |

FOREIGN PATENT DOCUMENTS

0003394A3 8/1979 European Pat. Off. .
2671398 7/1992 France .

Primary Examiner—Kevin P. Shaver
Attorney, Agent, or Firm—Vogt & O'Donnell

[57] ABSTRACT

An apparatus for dispensing food materials includes a conveyor and a valve housing positioned above the conveyor. The valve housing has an inlet opening, a dosing opening and an outlet opening, there being no conduit extending between the outlet opening and the conveyor below. A valve tap rotatably positioned in the chamber has an arcuate recessed portion extending between tap edges, one edge being shaped to define a triangular cutting portion having an apex which, upon rotation of the valve tap in the chamber, passes through a midpoint of the outlet opening and closes a central portion of the outlet opening before closing outer portions. When the valve tap is rotated in the chamber to a first position, a channel is formed communicating between the inlet opening and the dosing opening and the outlet opening is closed. Upon opposite rotation of the tap to a second position, a channel is formed communicating between the dosing opening and the outlet opening and the inlet opening is closed. In operation, pumpable food material is introduced through the inlet opening and into the chamber, the tap is rotated to form a channel communicating between the inlet opening and the dosing opening, and the food material is expelled through the outlet opening and towards the conveyor to deposit the food onto a support carried by the conveyor, such as a container or crepe.

9 Claims, 3 Drawing Sheets

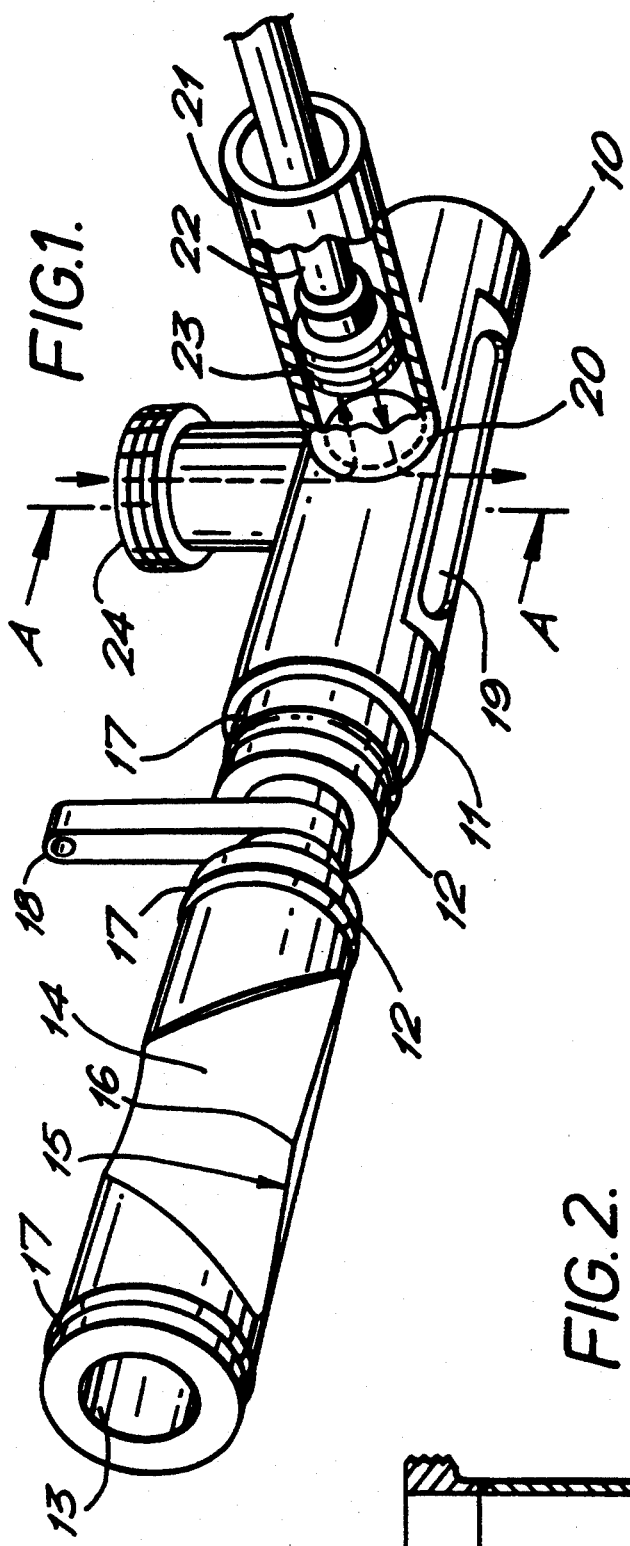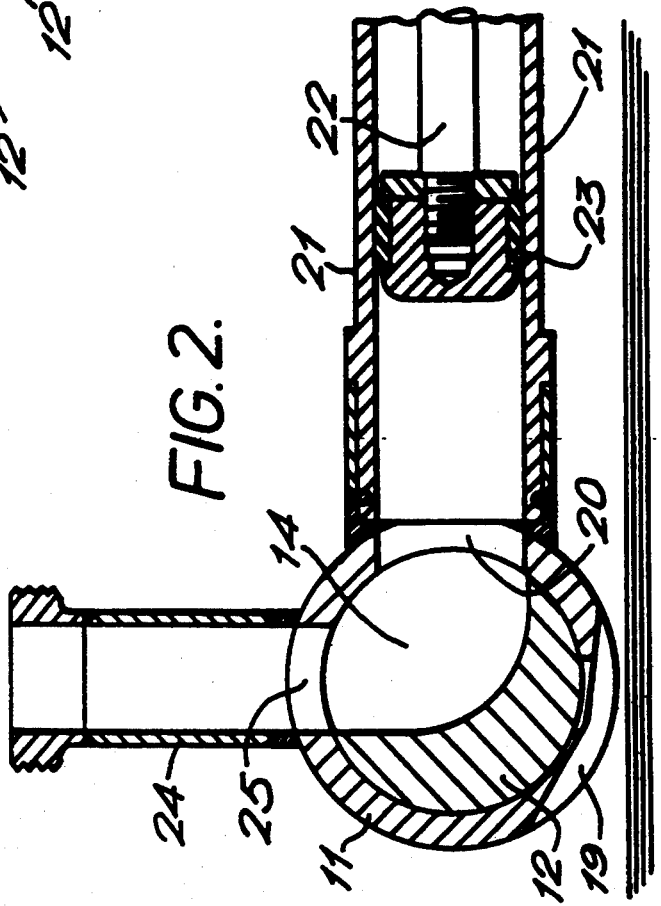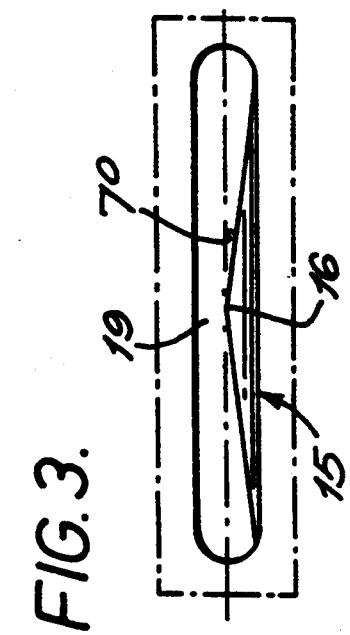

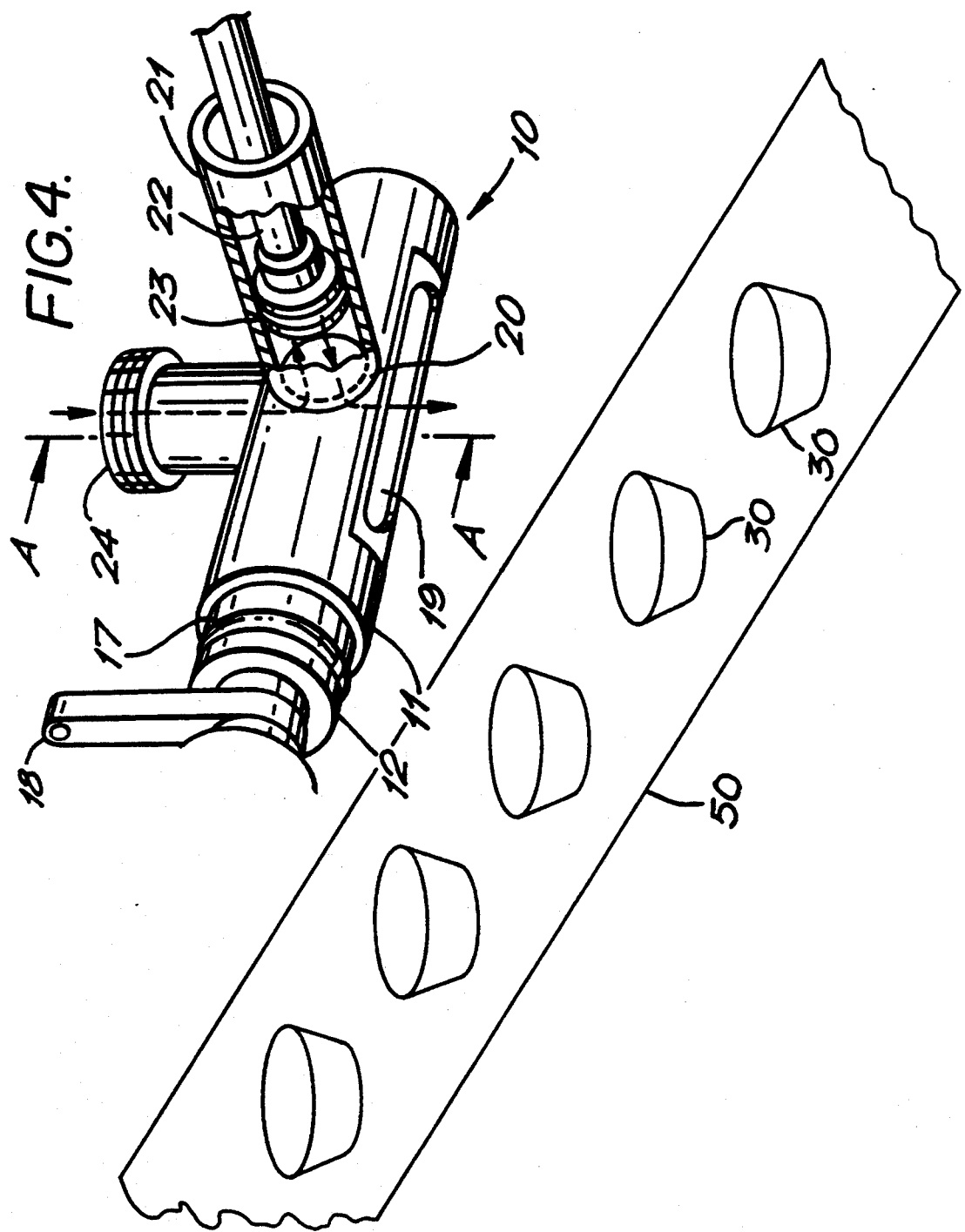

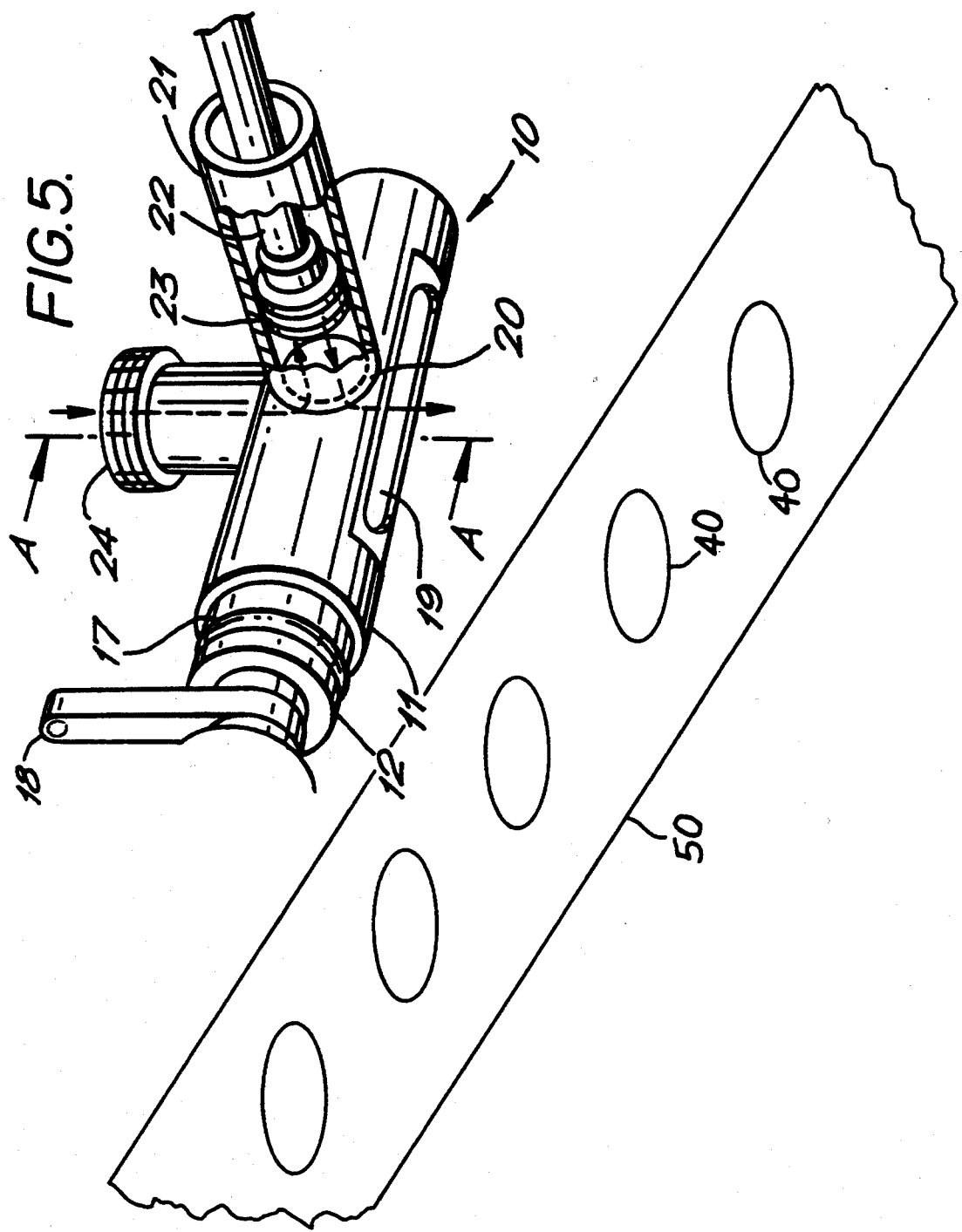

APPARATUS AND PROCESS FOR DISPENSING FOOD MATERIALS

BACKGROUND OF THE INVENTION

The present invention relates to an applicator for dosing pumpable food materials.

The dosing of pumpable food materials, such as stews and fillings, is conventionally performed by the use of piston fillers which are made up of the following successive components:
1) Material supply hopper,
2) Dosing cylinder connected to the hopper via a 3-way valve,
3) Tube for transportation of the food material from the dosing cylinder to the place of depositing,
4) Nozzle with cutting device for final depositing of the portions of mixed food materials.

Such equipment is not suitable for fillings containing solid pieces, however, because of problems which occur owing to weight variations caused by the long feeding distance between the dosing cylinder and the depositing nozzle, as well as inadequate cutting of the material in the nozzle. The general dosage performance and the weight accuracy are often less than desirable.

SUMMARY OF THE INVENTION

We have devised an applicator based on the same components conventionally used as described above, but in which the valve and the depositing nozzle are integrated into a single unit positioned directly above the depositing location. The transportation tube between the dosing cylinder and the nozzle is thus eliminated.

Accordingly, the present invention provides an applicator for dosing a pumpable food material comprising a dosing means and a three-way valve. The valve includes a valve house and a valve tap, the valve house having an inlet opening through which the pumpable food material may be supplied to the valve, a dosing opening through which the pumpable food material may be dosed and an outlet opening through which the pumpable food material may be deposited from the valve. The valve tap rotates to open alternately the inlet and dosing openings together and the outlet and dosing openings together.

The pumpable food material may be supplied to the inlet opening of the valve house by any suitable means which is advantageously an inlet pipe connected to a supply of the pumpable food material and a pump for supplying the pumpable food material. The pumpable food material is conveniently stored in a hopper.

The present invention also provides a method for dosing pumpable food materials by means of a dosing means and a three-way valve formed from a valve house and a valve tap which comprises supplying a pumpable food material to the valve through an inlet opening of the valve house, dosing the pumpable food material by way of the dosing means through a dosing opening of the valve house, and depositing the pumpable food material from the valve through an outlet opening of the valve house, wherein the valve tap rotates to open, alternately, the inlet and dosing openings together, to enable the pumpable food material to be supplied to the valve, and the outlet and dosing openings together, to enable the pumpable food material to be deposited from the valve.

The dosing means, for dosing the pumpable food material through the dosing opening may be any suitable dosing means and such means is conveniently provided by a cylinder and a dosing piston which may be operated pneumatically or hydraulically.

The outlet opening through which the pumpable food material may be deposited from the valve may be formed by the opening of a nozzle.

The valve house is preferably tubular, and the valve tap is conveniently positioned within the valve house. The valve tap is preferably solid and is conveniently formed with a recess in its wall, e.g., a milled-out portion, to provide a channel between the valve tap body and the internal wall of the valve house so that, on rotation of the valve tap on its longitudinal axis, the channel enables either the inlet and dosing openings together or the outlet and dosing openings together to communicate with interior of the valve house. Advantageously, the valve tap is adapted so that, during rotation, the dosing opening is in permanent communication with the interior of the valve house.

When the recess in the wall of the valve tap is aligned with the inlet and dosing openings, these openings communicate with the interior of the valve house and the wall of the valve tap closes the outlet opening. When the recess in the wall of the valve tap is aligned with the outlet and the dosing openings, the opening of a nozzle is formed at the outlet through which the pumpable food material may be discharged from the valve, while the wall of the valve tap closes the inlet opening.

Part of the edge of the recess in the wall of the valve tap is advantageously adapted to form a cutting edge and this enables the pumpable food material to be cut as it is deposited from the valve. The cutting edge may be shaped to enable the middle of the nozzle outlet opening to close before the extremity in order to control the distribution of the pumpable food material to the perimeter of the nozzle opening.

Preferably, in operation, the inlet opening of the valve house faces upwards, the dosing opening faces laterally and the outlet opening faces downwards above the depositing location.

The pumpable food material may be a mixed food material such as a filling or a stew, e.g., bolognaise, cannelloni, lasagne, crepe filling. The pumpable food material may be discharged into containers, or onto other food materials such as crepes or sheeted dough products travelling on a conveyor belt.

The applicator is conveniently adapted to operate automatically, where all the parts are coordinated by a control device such as a computer. The applicator may be adapted to dose and deposit a predetermined amount of pumpable food material, whereby the cylinder piston is controlled by a preprogrammed computer to dose a predetermined volume.

If desired, a plurality of applicators may be arranged in a row and coordinated on a production line.

The present invention is further illustrated by way of Example only with reference to the accompanying drawings.

BRIEF DESCRIPTION OF THE DRAWINGS

FIG. 1 is a perspective view of an applicator according to the invention.

FIG. 2 is a sectional view along the line A—A in FIG. 1 looking in the direction of the arrows.

FIG. 3 is a diagrammatic view of the underside of the valve showing the nozzle opening.

FIG. 4 illustrates filling a container with a food material in accordance with the invention.

FIG. 5 illustrates topping a crepe with a food material in accordance with the present invention.

DETAILED DESCRIPTION OF THE DRAWINGS

Referring to the drawings, as illustrated in FIG. 1, the applicator comprises a three way valve generally designated 10 formed from a valve house 11 mounted within which is a valve tap 12 (a second valve tap is shown exposed on the left side of FIG. 1). The valve tap 12 has a tap shaft hole 13, and its wall is formed with a milled-out portion 14 one edge of which is adapted to form a cutting edge 15 having the shape of an isosceles triangle having an apex 16 in the center and the angles opposite the two equal sides are 7°. The valve tap is provided with an O-ring 17 at each end for sealing to the inside of the wall of the valve house and an operating arm 18 to rotate the valve tap on its longitudinal axis within the valve house 11. As illustrated in FIG. 2, the valve house 11 is provided with a lower nozzle outlet opening 19, also illustrated in FIG. 3, a lateral dosing opening 20 to which is fitted a dosing cylinder 21 provided with a dosing piston 22 and a packing ring 23, and an upper inlet opening 25 to which is fitted an inlet pipe 24.

In operation, as illustrated in FIGS. 4 and 5, food-receiving supports, such as containers 30 or crepes 40, are transported successively on a conveyor belt 50 positioned beneath the applicator. The valve tap 12 is rotated by means of the operating arm 18 so that the milled-out portion 14 of the valve tap is aligned with the upper inlet opening 25 and the lateral dosing opening 20 of the valve house. A crepe filling stored in a hopper (not shown) is pumped through the inlet pipe 24 and then sucked into the dosing cylinder 21, as indicated by the arrows in FIG. 1, by the intake stroke of the piston 22. The valve tap 12 is then rotated in the opposite direction by means of the operating arm 18 so that the milled-out portion 14 of the valve tap is aligned with the lower nozzle outlet opening 19 and the lateral dosing opening 20 of the valve house. The crepe filling is then dosed out of the cylinder 21 by the output stroke of the piston 22, as indicated by the arrows in FIG. 1 and through the nozzle outlet opening 19. After closing the valve tap 12 is again rotated by means of the operating arm 18 in the opposite direction to bring the milled out portion 14 of the valve tap back into alignment with the upper inlet opening 25 and the lateral dosing opening 20 of the valve house. During this operation, the cutting edge 15 of the valve tap cuts the emerging crepe filling as it closes the nozzle outlet opening 19 firstly in the middle at the apex 16 and then at the edges, thus controlling the distribution of the filling on to a flat crepe on the conveyor belt.

The cycle is then repeated and all the moving parts are controlled and coordinated by a computer.

We claim:

1. An apparatus for dispensing food material comprising:
   a conveyor;
   a valve housing, positioned above the conveyor, having an exterior housing surface and an interior housing surface which defines a longitudinally extending chamber, the valve housing having an inlet opening, a dosing opening and an outlet opening extending, respectively, between the exterior housing surface and the interior housing surface, there being no conduit extending between the outlet opening and the conveyor beneath the outlet opening;
   a valve tap, rotatably positioned in the chamber, having an outer surface which contacts the interior housing surface and an arcuate recessed portion extending between tap edges, one edge being shaped to define a triangular cutting portion having an apex which, upon rotation of the valve tap in the chamber, passes through a midpoint of the outlet opening, transverse to the longitudinal extent of the chamber, and closes a central portion of the outlet opening before closing end portions of the outlet opening;
   means connected to the valve tap for rotating the tap in the chamber so that, upon rotation of the tap to a first position, the recessed tap portion forms a channel communicating between the inlet opening and the dosing opening and the outer tap surface closes the outlet opening, and so that, upon opposite rotation of the tap to a second position, the recessed portion forms a channel communicating between the dosing opening and the outlet opening and the outer tap surface closes the inlet opening;
   inlet means connected to the inlet opening for introducing pumpable food material into the chamber; and
   dosing means connected to the dosing opening for drawing a portion of pumpable food material through the inlet opening and into the chamber when the tap is positioned to form a channel communicating between the inlet opening and the dosing opening, and for expelling the portion of pumpable food material from the chamber, through the outlet opening and towards the conveyor, when the tap is positioned to form a channel communicating between the dosing opening and the outlet opening.

2. An apparatus according to claim 1 wherein the outlet opening is elongated and aligned with the longitudinal extent of the chamber.

3. An apparatus according to claim 1 wherein the triangular cutting portion is in a shape of an isosceles triangle.

4. An apparatus according to claim 1 wherein the dosing means comprises a cylinder and a reciprocable dosing piston positioned therein.

5. A process for dispensing a portion of a pumpable food material comprising:
   providing an apparatus recited in claim 1;
   advancing a food-receiving support on the conveyor beneath the outlet opening;
   rotating the valve tap in the chamber to the first position and introducing a portion of pumpable food material through the inlet opening and into the chamber; and
   rotating the valve tap to the second position and expelling the portion of food material from the chamber, through the outlet opening, and directly depositing the expelled material onto a food-receiving support on the conveyer.

6. A process according to claim 5 wherein the food-receiving support is a container.

7. A process according to claim 5 wherein the food-receiving support is a food material.

8. A process according to claim 5 wherein the food-receiving support is a crepe.

9. A process according to claim 5 wherein the food-receiving support is a sheeted dough product.

* * * * *

UNITED STATES PATENT AND TRADEMARK OFFICE
CERTIFICATE OF CORRECTION

PATENT NO. : 5,419,464
DATED : May 30, 1995
INVENTOR(S) : Anders P. GANROT, et al.

It is certified that error appears in the above-indentified patent and that said Letters Patent is hereby corrected as shown below:

On the title page item [73], change "Veney" to --Vevey--.

Column 1, line 16, after the comma after "depositing", insert --and--.

Column 2, line 1, insert the heading --DESCRIPTION OF PREFERRED EMBODIMENTS--.

Column 3, line 44, delete "closing" and insert therefor --dosing--.

Signed and Sealed this

Third Day of October, 1995

Attest:

BRUCE LEHMAN

*Attesting Officer*     *Commissioner of Patents and Trademarks*